United States Patent [19]
Wilcox

[11] Patent Number: 5,157,676
[45] Date of Patent: Oct. 20, 1992

[54] APPARATUS AND PROCESS FOR ACTIVE PULSE INTENSITY CONTROL OF LASER BEAM

[75] Inventor: Russell B. Wilcox, Oakland, Calif.

[73] Assignee: The United States of America as represented by the United States Department of Energy, Washington, D.C.

[21] Appl. No.: 540,237

[22] Filed: Jun. 19, 1990

[51] Int. Cl.⁵ ............................................. H01S 3/13
[52] U.S. Cl. ...................................... 372/29; 372/25; 372/30; 372/31; 372/38
[58] Field of Search ....................... 372/25, 30, 29, 31, 372/38

[56] References Cited

U.S. PATENT DOCUMENTS

| | | | |
|---|---|---|---|
| 3,521,069 | 7/1970 | de Maria et al. | 372/30 |
| 3,633,124 | 1/1972 | Danielmeyer | 372/30 |
| 3,641,459 | 2/1972 | Paoli et al. | 372/30 |
| 3,747,019 | 7/1973 | Koechner et al. | 372/30 |
| 4,025,875 | 5/1977 | Fletcher et al. | 372/30 |
| 4,059,759 | 11/1977 | Harney et al. | 372/25 |
| 4,071,751 | 1/1978 | Waksberg | 372/31 |
| 4,611,270 | 9/1986 | Klauminzer et al. | 372/30 |
| 4,768,198 | 8/1988 | Deki | 372/25 |

*Primary Examiner*—Georgia Y. Epps
*Attorney, Agent, or Firm*—Miguel A. Valdes; Henry P. Sartorio; William R. Moser

[57] ABSTRACT

An optically controlled laser pulse energy control apparatus and process is disclosed wherein variations in the energy of a portion of the laser beam are used to vary the resistance of a photodetector such as a photoresistor through which a control voltage is fed to a light intensity controlling device through which a second portion of the laser beam passes. Light attenuation means are provided to vary the intensity of the laser light used to control the resistance of the photodetector. An optical delay path is provided through which the second portion of the beam travels before reaching the light intensity controlling device. The control voltage is supplied by a variable power supply. The apparatus may be tuned to properly attenuate the laser beam passing through the intensity controlling device by adjusting the power supply, the optical delay path, or the light attenuating means.

21 Claims, 2 Drawing Sheets

APPARATUS AND PROCESS FOR ACTIVE PULSE INTENSITY CONTROL OF LASER BEAM

BACKGROUND OF THE INVENTION

The invention described herein arose in the course of, or under, Contract No. W-7405-ENG-48 between the United States Department of Energy and the University of California.

This invention relates to an apparatus and process for regulating the energy in a light pulse from a laser. More particularly, this invention relates to an optically controlled laser pulse energy regulating apparatus and process wherein variations in the energy of a pulsed laser beam are used to vary the resistance of a photoresistor through which a control voltage is fed to a light intensity controlling device through which the laser beam passes.

Many applications utilizing short laser pulses require good shot-to-shot amplitude stability, sometimes of less than a few percent variation. Unfortunately, lasers which can deliver high power typically exhibit poor amplitude stability.

In the prior art, many schemes have been proposed for regulating of laser output, including amplitude regulation, which involve the use of feedback loops wherein the energy of the laser beam is monitored and a signal is sent, via a feedback loop, back to the energy source.

For example, Danielmeyer U.S. Pat. No. 3,633,124 discloses an optically pumped solid-state laser wherein the pulse frequency, phase height, and width of relaxation oscillation pulsing of the laser are controlled by externally detecting the phase difference between a stable periodic perturbation of the pump light and the output pulse, then externally feeding back a signal to restore the laser output pulse phase to a fixed relationship to the phase of perturbation.

Paoli et al U.S. Pat. No. 3,641,459 describes apparatus and method for narrowing the width of pulses in the output of a semiconductor laser exhibiting self-induced pulsing and for stabilizing its repetition rate by applying to the laser a perturbation signal having a frequency that is related to the pulse repetition as the ratio of two integral numbers.

Fletcher et al U.S. Pat. No. 4,025,875 describes a method and apparatus for stabilizing the amplitude and repetition rate of mode-locked Nd:YAG laser pulses by controlling the laser length through a feedback loop. The end mirror of the laser is mounted on a piezoelectric crystal which is dithered at a low frequency. A portion of fundamental 1.06 micrometer laser radiation is converted into its second harmonic frequency and the average power of the second harmonic frequency is detected by an integrating detector. The amount of the power of the second harmonic frequency depends on the match between the optical length of the laser cavity and the mode-lock frequency. The length is controlled by a feedback loop which phase compares the output of the second harmonic detector to the piezoelectric crystal dither signal.

Brosio et al U.S. Pat. No. 4,319,203 discloses a laser system including a feedback circuit including a first branch which detects the mean amplitude of the laser energy and a second branch detecting the peak amplitude of its pulses. The second branch includes a bandpass filter, centered on the pulse cadence, followed by a peak detector which may comprise a coherent demodulator driven by a square wave whose frequency corresponds to the cadence. The peak detector generates a control signal for a pulse former whose output signals are superimposed upon a biasing signal from the first branch before being fed to the modulating input of the laser.

Klauminzer et al U.S. Pat. No. 4,611,270 describes a feedback loop control system for controlling energization of a pulsed laser which is periodically energized so that it emits a pulse of radiation following each periodic energization. The feedback loop includes a detector for detecting the laser pulses and producing an electrical signal representative of each pulse and a comparing circuit responsive to those electrical signals and a reference signal that represents the constant laser output level desired, for comparing the electric signals and the reference signals producing a control signal for controlling the energy of the periodic energization.

Control of the laser output has also been accomplished by the placement of control means along the beam path. For example, De Maria et al U.S. Pat. No. 3,521,069 teaches an apparatus for generating a high power laser pulse of very short duration by producing a train of simultaneously mode-locked and Q-switched laser pulses and sending one of the pulses through a shutter which is controlled by the pulse train.

Koechner et al U.S. Pat. No. 3,747,019 discloses a method and means for controlling both the amplitude and repetition frequency of a repetitively Q-switched laser by passing the laser pulses through a beam splitter in which the reflected light is passed to a photodetector which generates a signal proportional to the light amplitude. This signal is passed to a differential amplifier where it is compared with a reference signal and the difference is fed to a first Pockels cell through which the unreflected portion of the laser beam passes. The amplitude of the unreflected portion of the beam is modulated by the signal fed to the Pockels cell.

It would, however, be desirable to provide a device which is an energy regulator, rather than a power regulator, since this would make it possible to regulate the amplitude of arbitrarily short pulses, a useful feature in systems where the pulses are shorter than the response time of any electronic device. Furthermore, in contrast to the device of Koechner, which requires a fast high power electronic amplifier which is an expensive and complex element, it would be desirable to provide a device where simple passive components can be used and the electronic response time, i.e., the time required to reach steady state, can be longer than both the optical pulse duration and the optical delay, since the pulse can be regulated while the circuit voltages are still changing. Such a device would be simpler, less expensive, and better suited for the regulation of very short optical pulses, i.e., shorter than an electronic circuit response time.

SUMMARY OF THE INVENTION

It is, therefore, an object of this invention to provide an optically controlled pulse energy regulation apparatus for a pulsed laser.

It is another object of this invention to provide an optically controlled laser beam pulse energy regulation apparatus for a pulsed laser using a photodetector circuit through which a signal voltage passes to control a light intensity controlling device.

It is yet another object of this invention to provide an optically controlled laser pulse energy regulation apparatus wherein variations in the energy of a pulsed laser beam are used to vary the resistance of a photoresistor through which a control voltage is fed to a light intensity controlling device through which the laser beam passes.

It is still another object of this invention to provide a process for optically controlling the energy of a pulsed laser beam using variations in the energy of the laser pulse to vary the resistance of a photoresistor through which a control voltage is fed to a light intensity controlling device through which the laser beam passes to control the energy of the laser pulse.

These and other objects of the invention will be apparent from the following description and accompanying drawings.

DETAILED DESCRIPTION OF THE INVENTION

Figure 1:
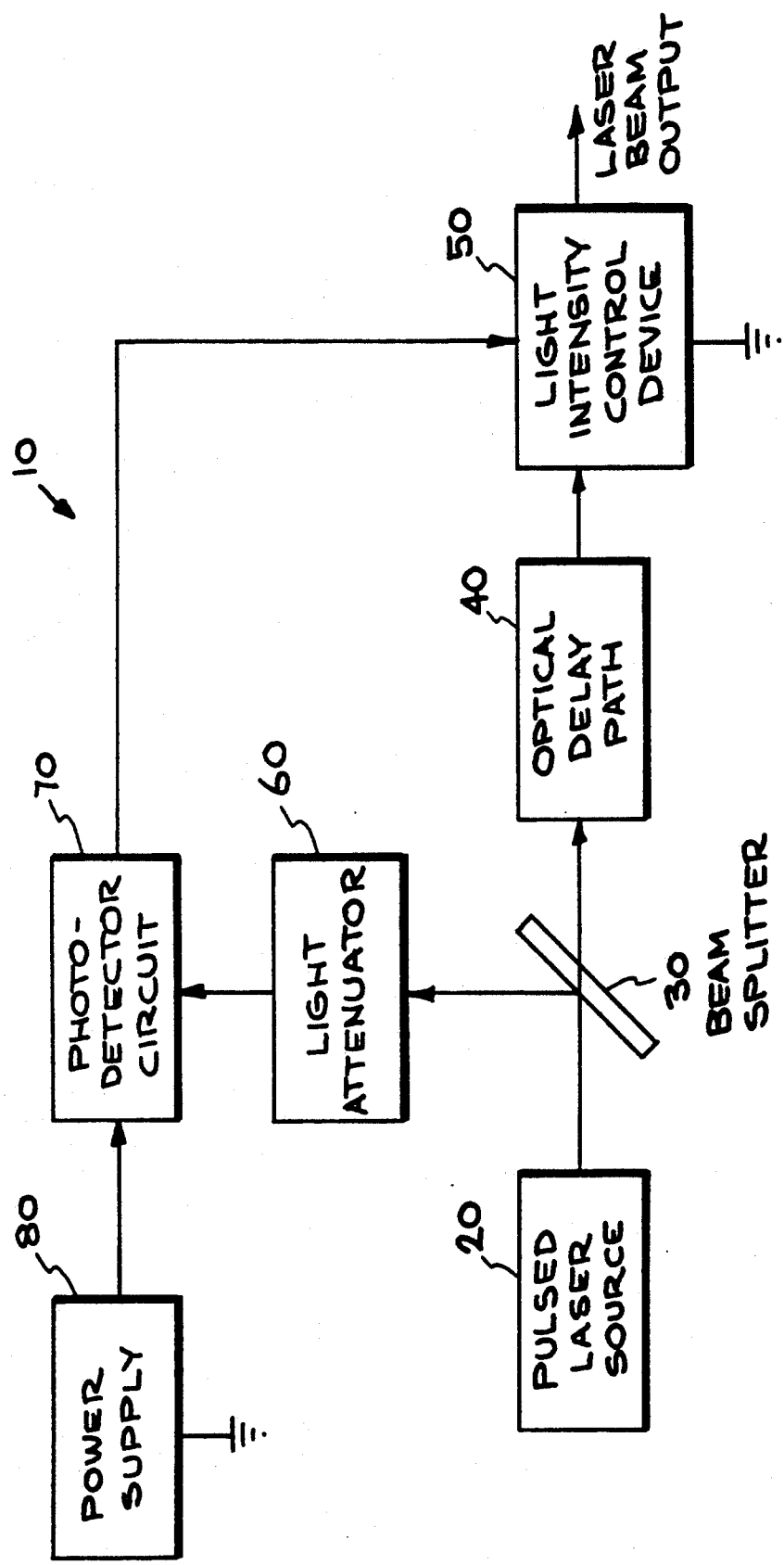
FIG. 1 is a schematic diagram showing the laser system of the invention with an optically controlled regulator used to control the energy of the pulsed laser beam via a photodetector circuit.

Referring to FIG. 1, a pulsed laser system is generally indicated at 10 comprising the optically controlled laser pulse energy regulating system of the invention. A laser source 20 provides a pulsed laser beam to a beam splitter 30 wherein a portion of the light passes to a photodetector circuit 70 through a light attenuator 60 while the remainder of the laser beam travels through an optical delay path 40 to a light intensity controlling device 50. An electrical signal from a voltage source 80 is fed through photodetector circuit 70 to device 50 to control the intensity of the laser beam traveling through light intensity controlling device 50.

Laser source 20 may comprise any commercially available laser source capable of activating the photoresistor, photodiode, or other photodetector used in photodetector circuit 70. The repetition rate of the laser pulse will be limited by the recovery time of the circuit which, when using a silicon photodetector is several hundred microseconds due to the carrier lifetime of the silicon detector. If a gallium arsenide detector is used instead, the repetition rate can be increased.

Beam splitter 30, which reflects a portion of the laser beam to photoconductive switch 70 through light attenuator 60 while passing the remainder of the beam to delay path 40, may comprise a glass member with a reflective coating or a polarizer. Such beam splitters are commercially available.

Figure 2:
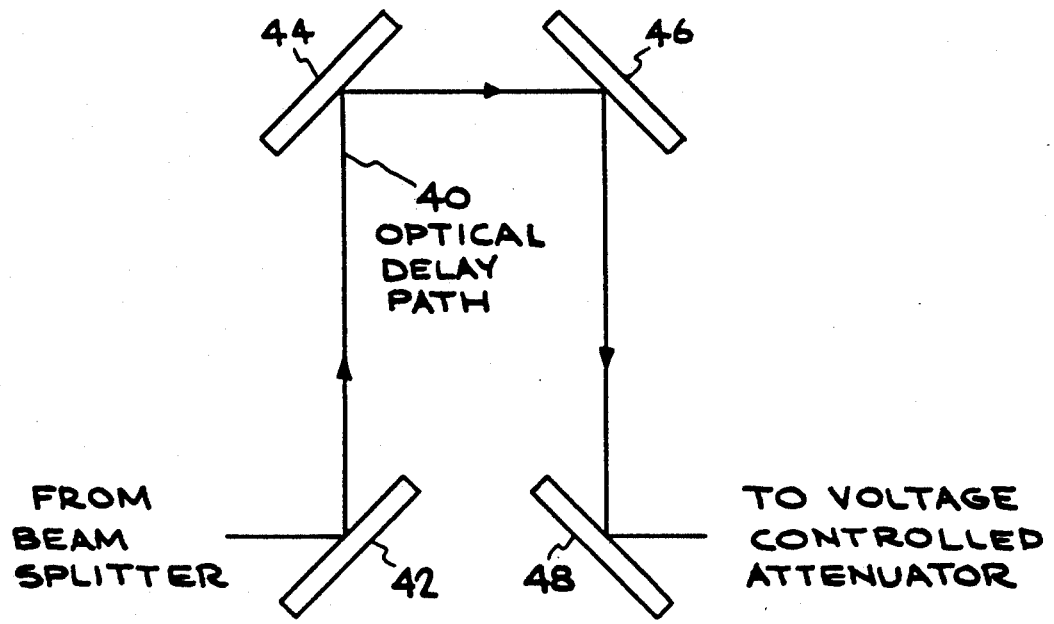
FIG. 2 is a schematic diagram of one form of optical delay path using mirrors.

Optical delay path 40 may comprise any suitable device which will serve to extend the laser beam path from beam splitter 30 to light intensity control device 50 so that the beam will pass through device 50 synchronized with the control signal being fed to light intensity controlling device 50 to attenuate the energy of the beam as will be explained in more detail below. For example, as shown in FIG. 2, optical delay path 40 may comprise a series of mirrors such as illustrated mirrors 42, 44, 46, and 48 which extend the laser beam path from beam splitter 30 to light intensity controlling device 50.

Light intensity controlling device 50, which controls the light intensity of the laser pulse, may comprise a high speed optical amplitude modulator such as a Pockels cell, a Kerr cell, an electroabsorptive semiconductor device, a waveguide directional coupler modulator (for fiberoptic applications), or any other type of device which will variably attenuate light energy in response to a variable electrical signal. The amount of attentuation is proportional to the energy incident on the photodetector; thus the system removes more energy from more energetic pulses, and less from less energetic pulses, resulting in constant pulse energy output. For purposes of illustration, and not of limitation, light intensity controlling device 50 will be hereinafter described as a Pockels cell.

Light attenuator 60 may comprise any adjustable means for controlling the intensity of the portion of the laser beam reaching photoresistor 70 from beam splitter 30, such as a polarizer.

Figure 3:
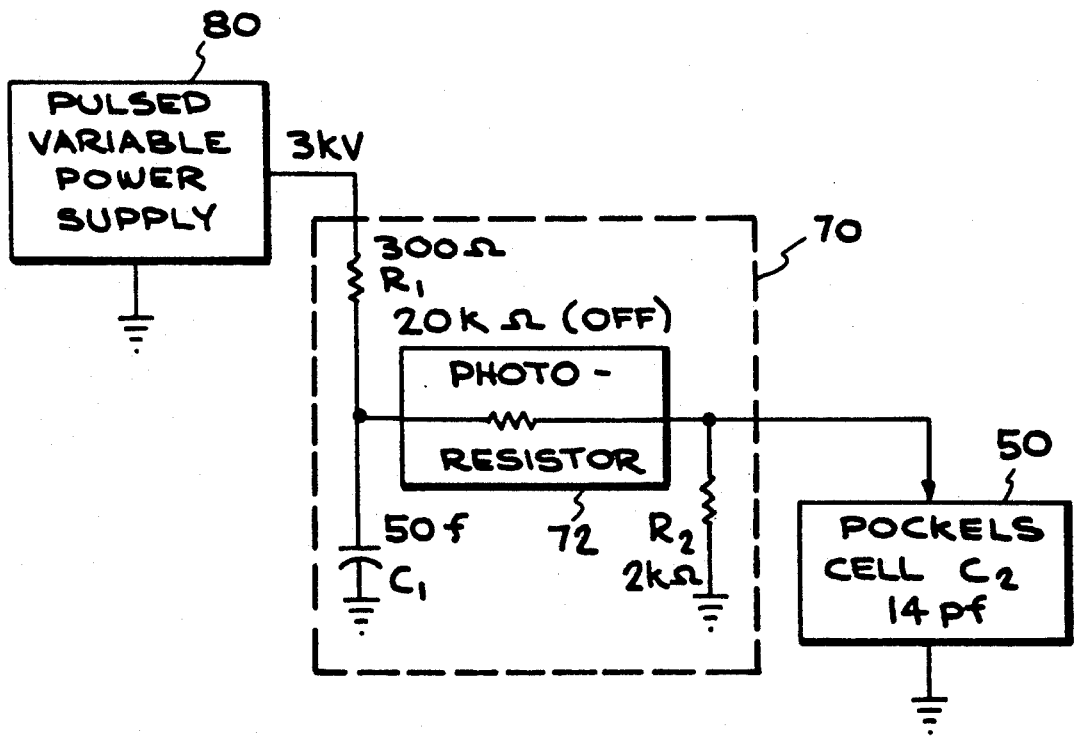
FIG. 3 is an electrical schematic of the photodetector circuit shown in FIG. 1.

Photodetection circuit 70 includes a photoconductive semiconductor device exhibiting a high resistance when not illuminated which falls to a much lower resistance when illuminated. This material stores carriers over microsecond scales, thus effectively integrating the optical energy. For example, as shown in FIG. 3, a silicon photoresistor 72 may be utilized having a resistance of about 20 thousand (20 k) ohms when not illuminated which drops to about 1–2 k ohms when illuminated. Such a device is simply a chip of intrinsic silicon with two metal electrodes deposited on the surface leaving a gap to hold off the high voltage, e.g., about 2.5 mm. The photoconductive semiconductor could also be a short carrier lifetime material such as gallium arsenide, and the integration would be done electronically.

Power supply 80 may comprise a steady or pulsed source of dc voltage, the choice of which will vary with the resistance of photoresistor 70 and the input voltage necessary to properly operate voltage controlled attenuator or light intensity controlling device 50. If a silicon photoresistor is used, thermal runaway breakdown must be avoided and therefore the high voltage required to operate the Pockels cell is supplied by a pulsed variable power supply for a short time, typically a microsecond, using a pulsed power supply voltage of about 3 kilovolts.

Referring to FIG. 1–3, the operation of the laser beam intensity control system 10 of the invention is as follows: A short pulse of light from laser source 20 is split into two parts by beam splitter 30. One part of the pulse is directed through light attenuator 60 to strike photoresistor 72 in photodetector circuit 70 to lower the resistance of the photoresistor. Power supply 80 charges capacitor $C_1$ through resistor $R_1$, while resistor $R_2$ serves to prevent charging of capacitor $C_2$ (Pockels cell 50). Lowering of the resistance of photoresistor 72 permits discharge of capacitor $C_1$ through photoresistor 72 into capacitor $C_2$ in Pockels cell 50. Pockels cell 50's birefringence changes, changing the transmission of the optical pulse through a polarizer. For this environment, the voltage on capacitor $C_1$ is slightly lower than the half wave voltage of Pockels cell 50. For the given circuit values, the optical delay is 1 to 2 nanoseconds.

The remainder of the beam passes through beam splitter 30 and optical delay path 40 which, in the illustrated embodiment of FIG. 2 comprises mirrors 42, 44, 46, and 48, before entering Pockels cell 50 where, as explained above, the energy of the pulse is attentuated in proportion to the energy falling on photoresistor 72, with more energy removed from more energetic pulses and less from less energetic pulses.

Thus, the higher the energy of the pulse striking photoresistor 72 in photodetector circuit 70, the more conductive photoresistor 72 becomes, letting a higher signal voltage reach Pockels cell 50 to further attenuate the main portion of the laser beam passing through cell 50.

The system may be initially set up to provide partial attenuation of the laser beam to a desired energy by measuring the output of the laser beam with an intensity or energy meter as the laser emerges from Pockels cell 50 and then adjusting attenuator 60 (and/or power supply 80) until the desired laser beam power is reached.

However, it is also necessary to have optical delay 40 due to the finite response time of the circuit. Thus, a signal fed to Pockels cell 50 from power supply 80 through photoresistor 70, while proportional to the laser pulse energy striking photoresistor 70 at that moment, may not be able to adjust Pockels cell 50 sufficiently to either raise or lower the energy of the other portion of the laser pulse (due to the slow response time of the circuit) unless the main portion of the laser beam is slightly delayed.

This delay is accomplished by optical delay path 40. By moving the position of, for example, mirrors 44 and 46 shown in FIG. 2, the delay path may be extended or shortened to tune this response time so that the signal reaching Pockels cell 50 will have changed the attenuation of the cell by an amount which just corresponds to the amount of attenuation needed for the main beam as it passes through cell 50. As with the initial setup of the system, the tuning may be carried out by monitoring the output of the laser beam from switch 50 with an energy meter.

It should be noted that the control signal fed to Pockels cell 50 does not necessarily change the polarization in the cell to a final position corresponding to the energy of the signal voltage prior to arrival of the beam segment having a matching energy to the segment striking photodetector circuit 70. Rather the system is designed to operate dynamically wherein the position through which the polarization in the cell is changing at any given moment matches the proper energy attenuation needed for the beam segment passing through cell 50 at that moment.

Since the voltage reaching the Pockels cell is a changing function of time, the voltage present when the optical pulse passes through the cell is a function of the optical delay which changes the time, the voltage slope which changes the voltage at a particular time, and the voltage amplitude which also changes the voltage at a particular time. Varying the optical delay varies the time; varying the energy on photoresistor 72 varies the voltage slope, and varying the supply voltage varies the applied voltage. These three parameters can be varied to "tune" the regulator to a particular area of operation. They are independent, so typically one is fixed and the other two are varied. The optical delay is usually the most difficult to change, so it is usually fixed.

While a specific embodiment of the optically controlled laser pulse energy regulation apparatus and process of the invention has been illustrated and described, modifications and changes of the apparatus, parameters, materials, etc. will become apparent to those skilled in the art, and it is intended to cover in the appended claims all such modifications and changes which come within the scope of the invention.

What is claimed is:

1. An optically controlled laser beam pulse energy regulation apparatus for a pulsed laser beam comprising:
   (a) photodetection means;
   (b) means for directing a first portion of said pulsed laser beam onto said photodetection means to vary the resistance of said photodetection means in proportion to the energy of said beam;
   (c) light intensity controlling means through which a second portion of said pulsed laser beam passes;
   (d) means for integrating the beam energy incident on said photodetection means to generate a control voltage proportional to the beam energy to said light intensity controlling means; and
   (e) optical delay means through which said second portion of said laser beam passes before entering said light controlling means;

whereby a control voltage is applied to said light intensity controlling means which is proportional to the amount of light energy striking said photodetection means.

2. The apparatus of claim 1 wherein said first portion of said laser beam passes through light attenuation means before striking said photodetection means.

3. The apparatus of claim 1 wherein said optical delay means is an optical path of adjustable length.

4. The apparatus of claim 2 wherein said means for passing a control voltage through said photodetection means to said light intensity controlling means further includes a variable voltage power supply.

5. The apparatus of claim 1 wherein said photodetection means further comprise a photoresistor.

6. The apparatus of claim 5 wherein said photoresistor is a silicon photoresistor.

7. The apparatus of claim 5 wherein said means for passing a control voltage through said photodetection means to said light intensity controlling means further includes a pulsed variable voltage power supply.

8. The apparatus of claim 7 wherein said photodetection means further comprise a silicon semiconductor photoresistor.

9. The apparatus of claim 4 wherein said apparatus is tuned to synchronize the response of said light intensity controlling means to said control voltage to vary the energy of the laser beam passing through said light intensity controlling means by one or more of said light attenuation means, said optical delay means, or said variable power supply.

10. The apparatus of claim 5 wherein said means for directing said first portion of said laser beam to said photodetection means comprises a beam splitter.

11. An optically controlled laser beam pulse energy regulation apparatus for a pulsed laser beam comprising:
    (a) photodetection means;
    (b) beam splitter means for directing a first portion of said pulsed laser beam onto said photodetection means to vary the resistance of said photodetection means in proportion to the intensity of said beam;
    (c) light attenuation means through which said first portion of said pulsed laser beam passes before striking said photodetection means;
    (d) light intensity controlling means through which a second portion of said pulsed laser beam passes;
    (e) an optical delay line through which said second portion of said laser beam passes before entering said light intensity controlling means;

(f) means including a variable voltage power supply for passing a control voltage through said photodetection means to said light intensity controlling means;

whereby a control voltage is applied to said light intensity controlling means which is proportional to the amount of light striking said photodetection means to thereby change the energy of the laser beam passing through said light intensity controlling means and said apparatus may be tuned to vary the energy of the laser beam passing through said light intensity controlling means by one or more of said light attenuation means, said optical delay line, or said variable power supply.

12. The apparatus of claim 11 wherein said light intensity controlling means is selected from the class consisting of a Pockels cell, a Kerr cell, a waveguide electrooptic modulator, and an electroabsorptive cell.

13. The apparatus of claim 12 wherein said light intensity controlling means comprises a Pockels cell.

14. The apparatus of claim 11 wherein said photodetection means comprises a photoresistor.

15. The apparatus of claim 14 wherein said photoresistor is a silicon photoresistor.

16. The apparatus of claim 14 wherein said power supply is a pulsed power supply and said photoresistor is a semiconductor photoresistor.

17. A process for optically controlling the energy of a pulsed laser beam comprising:
(a) providing a photoresistor;
(b) directing a first portion of said pulsed laser beam onto said photoresistor to vary the resistance of said photoresistor in proportion to the energy of said beam;
(c) directing a second portion of said pulsed laser beam toward a light intensity controlling means;
(d) producing a control voltage proportional to integrated beam energy incident on said photoresistor and applying the control voltage to said light intensity controlling means; and
(e) optically delaying said second portion of said pulsed laser beam before entering said light intensity controlling means; whereby said control voltage applied to said light intensity controlling means is proportional to the amount of integrated light energy directed onto said photoresistor.

18. The process of claim 17 including the further step of passing said first portion of said laser beam through light attenuation means before reaching said photoresistor.

19. The process of claim 18 wherein the step of optically delaying is performed by passing said second portion to said laser beam through an optical delay path of adjustable length.

20. The apparatus of claim 19 including the step of supplying said control voltage to said photoresistor from a variable voltage power supply.

21. The process of claim 20 including the further step of tuning said apparatus to vary the energy of said laser beam passing through said light intensity controlling means by adjusting one or more of said light attenuation means, said optical delay line, or said variable voltage power supply.

* * * * *